United States Patent
Elberbaum (10) Patent No.: US 6,493,034 B1
(45) Date of Patent: Dec. 10, 2002

(54) METHOD AND APPARATUS FOR REMOTE ADJUSTMENT OF A TIME DELAY CIRCUIT OF EXTERNALLY SYNCHRONIZED VIDEO TRANSMITTERS

(75) Inventor: David Elberbaum, Tokyo (JP)

(73) Assignee: Elbex Video Ltd., Tokyo (JP)

( * ) Notice: Subject to any disclaimer, the term of this patent is extended or adjusted under 35 U.S.C. 154(b) by 0 days.

(21) Appl. No.: 09/378,903

(22) Filed: Aug. 23, 1999

(51) Int. Cl.[7] .................................. H04N 9/475
(52) U.S. Cl. ................... 348/512; 348/518; 348/705; 370/519; 375/358
(58) Field of Search ..................... 348/512, 513, 348/518, 519, 705; 370/503, 507, 508, 519, 520; 375/355, 358, 362; H04N 9/475

(56) References Cited

U.S. PATENT DOCUMENTS

| | | | |
|---|---|---|---|
| 4,603,352 A | * 7/1986 | Kaneta et al. | 348/518 |
| 5,249,051 A | * 9/1993 | Elberbaum et al. | 348/521 |
| 5,283,649 A | * 2/1994 | Elderbaum et al. | 348/500 |
| 5,293,231 A | * 3/1994 | Elberbaum et al. | 348/500 |
| 5,303,050 A | * 4/1994 | Nishimura et al. | 348/211.2 |
| 5,335,014 A | * 8/1994 | Elberbaum | 348/159 |
| 5,579,060 A | * 11/1996 | Elberbaum | 348/705 |
| 5,751,368 A | * 5/1998 | Cooper | 348/129 |
| 5,995,140 A | * 11/1999 | Cooper et al. | 348/153 |
| 6,005,633 A | * 12/1999 | Kosugi | 348/14.02 |

* cited by examiner

Primary Examiner—John Miller
Assistant Examiner—Brian Yenke
(74) Attorney, Agent, or Firm—Katten Muchin Zavis Rosenman (57) ABSTRACT

In a method and apparatus for delaying propagation time of an external synchronizing signal transmitted from a receiver to transmitters which transmit a video signal to the receiver, each transmitter has an adjustable propagation delay timer which delays propagation of the external synchronizing signal. The receiver includes a detection circuit for detecting a time coincidence or a time difference between the external synchronizing signal and a sync portion of a video signal selected by a selector to be transmitted to the receiver, and a circuit which modifies the external synchronizing signal to produce a fluctuated external synchronizing signal when the detection circuit detects the time difference between the external synchronizing signal and the sync portion of the selected video signal.

31 Claims, 10 Drawing Sheets

METHOD AND APPARATUS FOR REMOTE ADJUSTMENT OF A TIME DELAY CIRCUIT OF EXTERNALLY SYNCHRONIZED VIDEO TRANSMITTERS

BACKGROUND OF THE INVENTION

1. Field of the Invention

This invention relates to an apparatus for generating video signals and television cameras used in close circuit television for a monitoring system.

2. Description of the Prior Art

In a monitoring television system used as one of information transmission systems, at least one television monitor is connected through a selector to a plurality of television cameras via a plurality of transmission lines. Picture images picked up by one or several TV cameras are displayed on the TV monitor through the selector that employs an electronic switch. The electronic switch provides selection of any individual television camera or sequentially switches a plurality of television cameras for displaying a picture image of one camera after another on the television monitor or for recording into a video recorder.

In such an information transmission system it is preferable to mutually lock the internal synchronizing signals of a plurality of television cameras and the switching time to an external synchronizing signal in order to prevent the picture image on the monitor from being disturbed during and immediately after the switching operation from one television camera to another.

As devices for synchronizing a plurality of television cameras, there are known apparatuses for transmitting a vertical synchronizing signal or a vertical synchronizing signal and a horizontal synchronizing signal, or a composite synchronizing signal used in a television system.

In any of the known devices of the type under discussion, as the transmitted synchronizing signal itself is a train of pulses, which can be easily influenced by noise, the transmission of a synchronizing signal requires the use of coaxial cables with their high shielding effect or fiber optic cables, which makes it costly for the systems with a plurality of television cameras.

Another known apparatus for synchronizing a plurality of television cameras, is an apparatus for transmitting an external synchronizing signal from an external synchronizing generator to the television cameras by injecting the external synchronizing signal into the video signal transmission line and locking an internal synchronizing signal generator of the television camera by means of the transmitted external synchronizing signal. Such an apparatus is disclosed in U.S. Pat. No. 4,603,352, the entire contents of which are incorporated herein by reference.

Furthermore, in such an information transmission system, a selector which is disposed at the monitor site is connected to a plurality of coaxial cables or other transmission lines such as twisted pair, fiber optics for selectively receiving video signals. If several cameras of such a system are installed apart, from near and up to distant locations, the plurality of coaxial cables and/or other transmissions lines with random stretches of length cause different time delays for the propagation of the external sync toward the cameras and for the return propagation of the video signals toward the receiving end, and this causes synchronizing timing errors at the receiving end and thereby loss of synchronization.

SUMMARY OF THE INVENTION

It is an object of the present invention to provide a method and an apparatus for adjusting a time delay circuit associated with each of the television cameras and its transmission line to delay the application of external sync pulses to the internal sync generators of the cameras commensurating with the length of each transmission line, so that the timing of the internal sync of each television camera is adjusted to coincide with the timing of the external synchronizing pulse and the internal sync of all the other cameras at the receiving end, to thereby, overcome random timing errors.

Further, as the television cameras are scattered into distant locations the individual adjustment of each camera at its site is time consuming, another object of the present invention is to provide a method and an apparatus for remotely adjusting a time delay circuit associated with each of the television camera and its transmission line.

Yet another object of the present invention is to provide a method and an apparatus for an automatic self adjustment of a time delay circuit associated with each of the television cameras and its transmission line in a closed loop process between the cameras and a receiver.

According to the present invention an external synchronizing signal injected into the transmission line leading from the receiver to the transmitters or television cameras is modified in the receiver so as to produce a fluctuated external synchronizing signal.

The term "fluctuated external synchronizing signal" which is used throughout the present application means a broader term for changing identifying a synchronizing signal that includes changing of an amplitude or level of the synchronizing pulse and/or its width and/or its polarity and/or removal of one or a number of pulses from the pulse train, thereby altering or fluctuating the external synchronizing signal which is recognized by those video transmitters or television cameras which need to be adjusted.

The terms "transmitter" and "television cameras" used throughout the application means a video signal generating apparatus, analog or digital, incorporating an internal sync generator that can be synchronized or locked to an external synchronizing signal for outputting an externally synchronized composite video signal or a digital video signal.

The term "transmission line(s)" used throughout the application means physically connected transmission lines such as coaxial cables or twisted pairs or optical fibers. It also means wireless communications such as a micro wave link, or a satellite link, or a combination of any of the above, being interconnected or routed via trunks, a public telephone network or Local Area Network (LAN) that provide two way communications between a transmitter and a receiver.

The above and other objects of the invention are attained by a method for a remote adjustment of time delay circuits of a plurality of television cameras, which method comprises the steps of transmitting an external synchronizing signal from a receiver to said television cameras through a plurality of transmission lines, and receiving a composite video signal from a selected television camera among said plurality of television cameras through a selected transmission line for displaying said received composite video signal on a monitor, and for identifying a timing error between the timing of said external synchronizing signal transmitted from said receiver to said selected television camera and the timing of the sync portion of the received composite video signal from said television camera, wherein said external synchronizing signal is modified in said receiver to produce a fluctuated external synchronizing signal whenever said receiver identifies a timing error and wherein a delay circuit in said television camera will gradually adjust a time delay thereof when it identifies that the external synchronizing signal is fluctuated or stop a time delay adjustment thereof when the external synchronizing signal is no longer fluctuating.

The objects of the present invention are further attained by a remote adjustment of a time delay apparatus for a television system which comprises a plurality of transmitters for transmitting a composite signal or a digital video signal; a receiver for receiving said composite signal or a digital video signal; and a plurality of transmission lines for transmitting and receiving information between said transmitters and said receiver, said receiver including a generating circuit for generating an external synchronizing signal, a transmitting circuit for transmitting said external synchronizing signal to said transmitters through said transmission lines, a detecting circuit for detecting time errors between the time of said external synchronizing signal and time of the sync portion of said received composite video signal and for outputting time error signal, and means for modifying the external synchronizing signal for producing a fluctuated external synchronizing signal when a time error signal is received, each of said transmitters including a detecting circuit for detecting said external synchronizing signal for applying the detected synchronizing signal to an internal sync generator to lock said internal sync generator to said external synchronizing signal, an adjustable timer circuit for delaying an application of said detected synchronizing signal, a sensor circuit for detecting a fluctuated external synchronization signal and feeding a fluctuated signal to said adjustable timer for adjusting the delay time.

In a preferred embodiment of the present invention, the circuits for fluctuating the external synchronizing signal and for detecting the fluctuated synchronizing signal are disclosed in U.S. Pat. No. 5,335,014, the entire contents of which are incorporated herein by reference.

The external synchronizing generator may include a circuit for generating external synchronizing pulse signals having a level higher than the white level or lower than the black level of the composite video signal generated by the transmitters, injecting the synchronizing pulse into the video transmission lines connected to the transmitters, and synchronizing the internal synchronizing generators of the transmitters on the basis of the injected synchronizing pulses.

The transmitters preferably each include a level comparator circuit for separating the external synchronizing pulse signals from the composite video signal on the basis of a level difference and applying the separated external synchronizing pulses to the transmitters.

According to the present invention, as the transmitters are synchronized by a pulse signal propagated from the receiver through the video transmission line and the propagation time delay is adjusted by fluctuating said pulse signal the adjustment of the time delay circuit can be carried remotely from the receiving end.

The foregoing and other objects and features of the invention will become apparent from the following description of preferred embodiments of the invention with reference to the accompanying drawings.

BRIEF DESCRIPTION OF THE DRAWINGS

FIGS. 7A, 7A-1 and 7B through 7D are block diagrams showing embodiments of the pulse shaping and timing circuit of the remote adjustment of the time delay apparatus of the present invention;

DETAILED DESCRIPTION OF THE PREFERRED EMBODIMENTS

Figure 1:
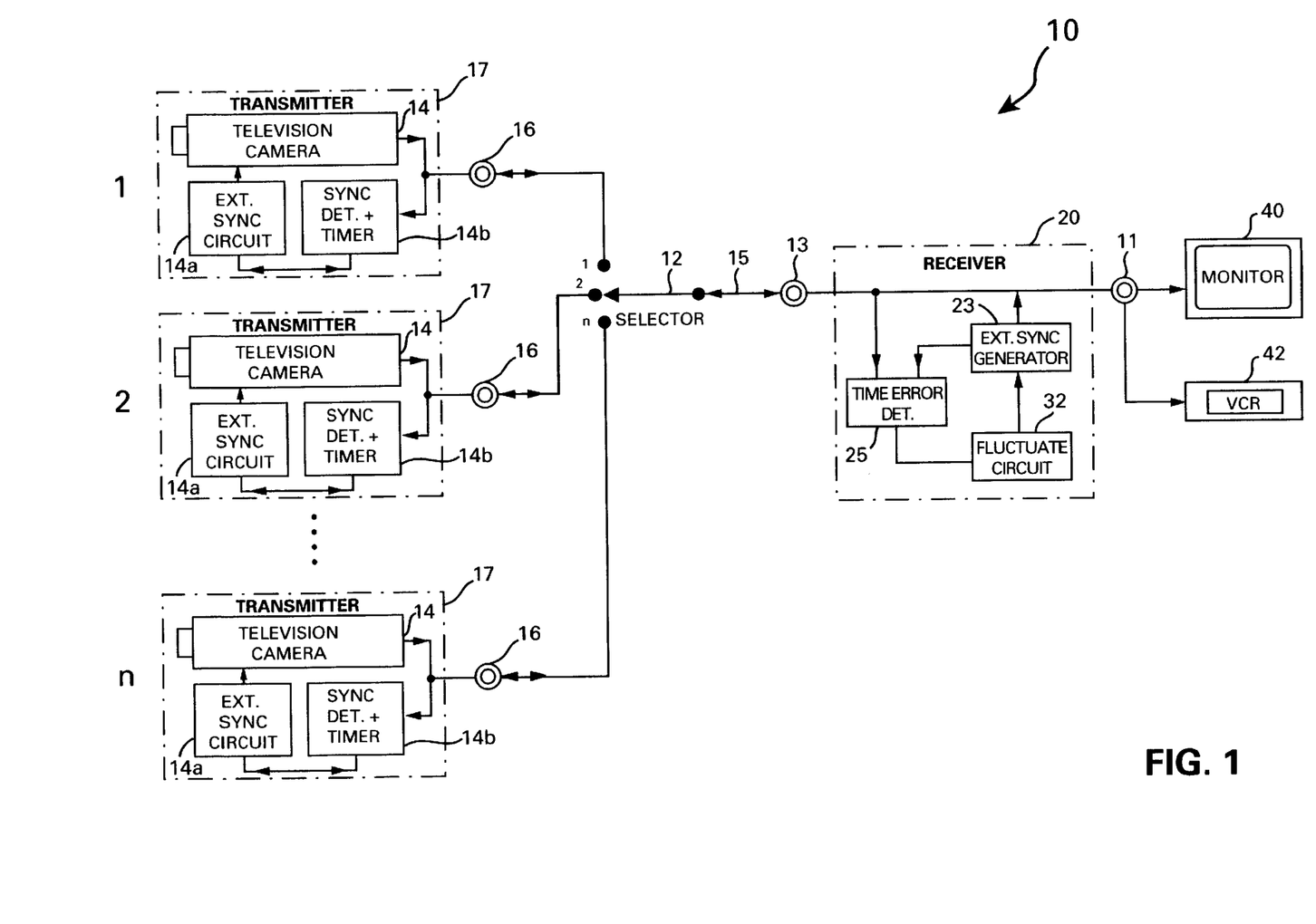
FIG. 1 is a block diagram of an electric circuit for a remote adjustment of a time delay apparatus according to a first embodiment of the present invention.

Referring to FIG. 1, an apparatus for a remote adjustment of the time delay 10 of the present invention includes a plurality of transmitters 17 incorporating television cameras 14 synchronized by an external synchronizing signal and generating a composite video signal corresponding to the images picked-up by the television cameras in a manner disclosed in the aforementioned U.S. Pat. No. 4,603,352. Each transmitter 17 further includes a synchronizing circuit 14a and a sync detector with an adjustable timer circuit 14b.

A receiver 20 is connected to transmitters 17 via a video transmission line 15 and via a selector switch 12 for receiving and outputting a selective composite video signal to a TV monitor 40 and to a video recorder VTR 42 and for detecting time errors between the external synchronizing signal generated signal and for modifying or fluctuating the external synchronizing signal when line errors are detected.

The frequency of the external synchronizing' signal commensurates with the frequency of the vertical scanning frequency of the video signal outputted from the transmitter 17. The frequency of the external synchronizing signal may be either a frame scanning frequency or a field scanning frequency. For example, in case of the NTSC system the vertical synchronizing signal frequency is 60 Hz; therefore, the field frequency is 60 Hz and the frame frequency is 30 Hz.

Figure 3:
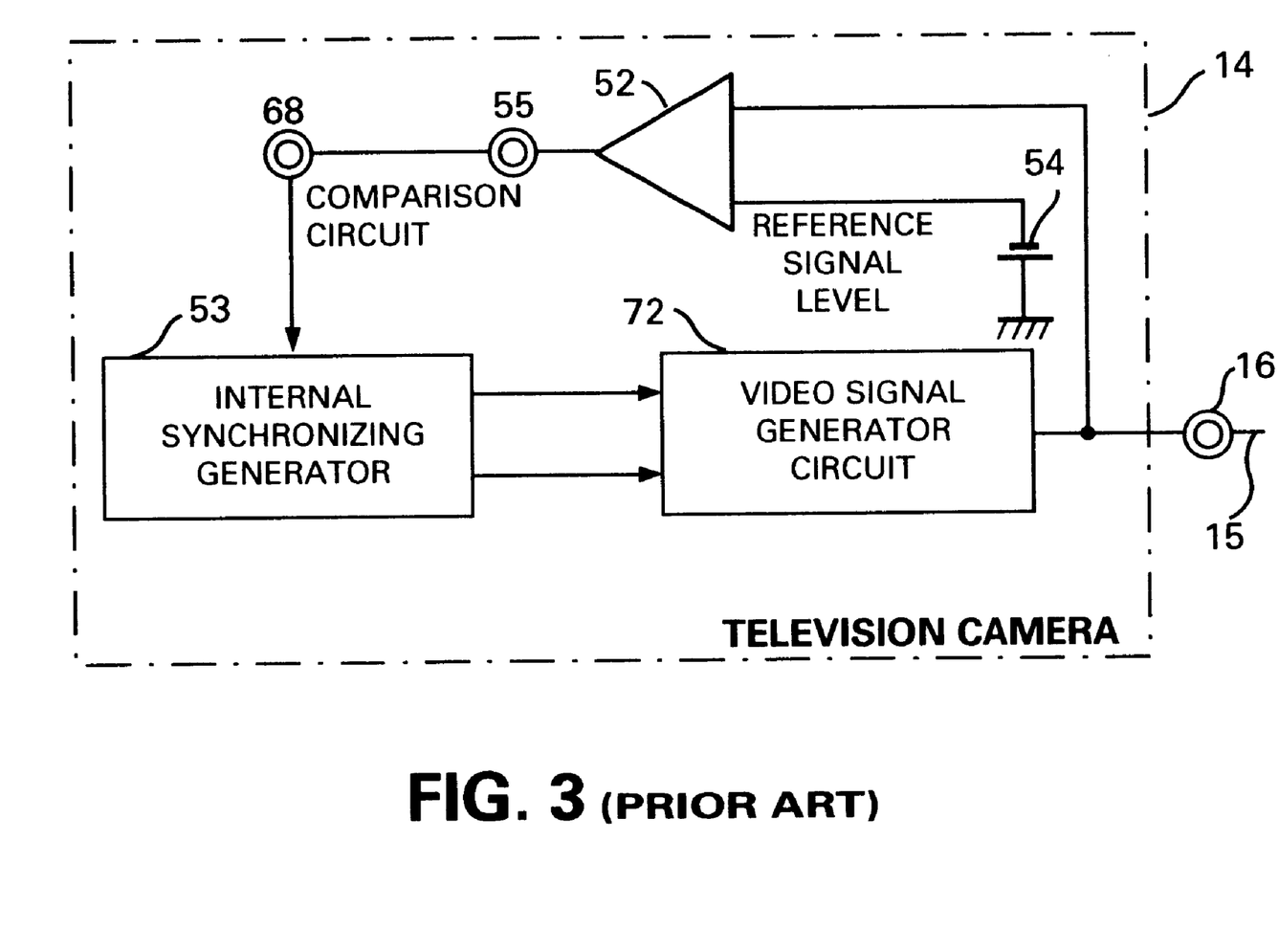
FIG. 3 is a block diagram of an electric circuit of a television camera operated with a known frame-or-field-externally synchronizing method.

As shown in FIG. 3, the television camera 14 is a well-known television camera synchronized by a synchronizing pulse having a level higher than the white level of a composite video signal, as described in the aforementioned U.S. Pat. No. 4,603,352.

Figure 2:
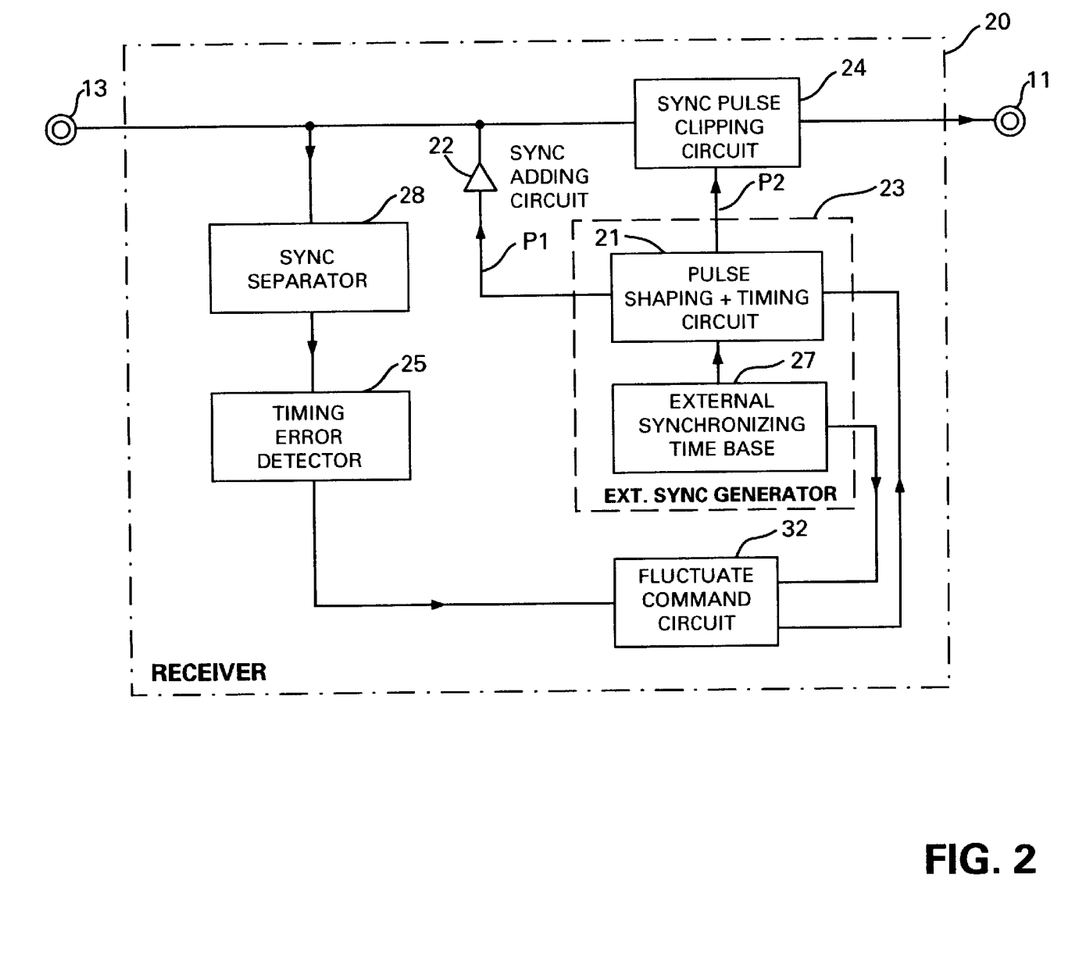
FIG. 2 is a block diagram of an electric circuit of a television receiver with a frame or field external synchronizing generator and a circuit for modifying the external synchronizing signal according to a preferred embodiment of the present invention.

Each television camera 14 (FIG. 3) comprises a comparison circuit 52 for comparing the voltage level of the vertical frame or field synchronizing pulse fed from an external synchronizing signal generator 23 of receiver 20 shown in FIG. 2 through the video transmission line 15 to a reference voltage source 54, and generating a pulse signal when a frame or a field synchronizing pulse is equal to or higher than the reference voltage of reference voltage source 54. The TV camera further includes an internal synchronizing signal generator 53 for receiving a pulse signal outputted from the comparison circuit 52 and generating an internal synchronizing signal synchronized with the received pulse signal, and a video signal generating circuit 72 for generating a video signal.

One input terminal of the comparison circuit 52 is connected to the video transmission line 15 through terminal 16, and the other input terminal of the comparison circuit 52 is connected to the reference voltage source 54. The reference voltage of the reference voltage source 54 has a level higher than the white level of the composite video signal. However, the reference voltage may be lower than the black level of the composite video signal when the external synchronizing signal level is lower than the black level of the composite video signal.

The internal synchronizing signal generator 53 generates horizontal and vertical synchronizing signals on the basis of the pulse signal outputted from the comparison circuit 52. The composite video signal corresponding to the observed image is outputted from the video signal generating circuit 72 and is fed to the video transmission line 15 through terminal 16.

The output of the comparison circuit 52 of FIG. 3 is directly connected via terminals 55 and 68 to the synchronizing input of the internal synchronizing generator 53 without time delay, thereby locking the internal synchronizing generator instantly which locking is a normal locking method for the well-known television camera 14.

Referring to FIG. 2, receiver 20 includes a synchronizing pulse adding circuit 22 connected to the external synchronizing generator 23 and injecting the external synchronizing signal into the video transmission line 15 for transmitting the external synchronizing signal to the television cameras 14, and a synchronizing pulse clipping circuit 24 for clipping and removing external synchronizing pulses from a receiver output 11.

As further shown in FIG. 2, the synchronizing pulse adding circuit 22 injects the frame or field external synchronization pulse into the video transmission line 15 through a receiver input terminal 13 connected also to a sync separator 28. However, depending on the synchronizing method and location of the synchronizing generator, the synchronizing pulse adding circuit 22 may be connected to other junctions along the video transmission lines for injecting the frame or field external synchronizing pulses.

Since the internal synchronizing signal generator 53 of each TV camera 14 is synchronized with the injected external frame or field synchronizing pulse, the frame synchronizing pulse is present in the video transmission line 15 within the period corresponding to the vertical blanking interval in the composite video signal. In this step, the external frame or field synchronizing pulse is transmitted through the transmission line used for the video signal propagation without affecting the video signal transmitted from the television camera.

In order to avoid a signal level input error it is preferable to remove signal levels that are larger than the white level of the composite video signal from the composite video signal reaching the inputs of the monitor 40 or the video recorder 42.

Figure 6A:
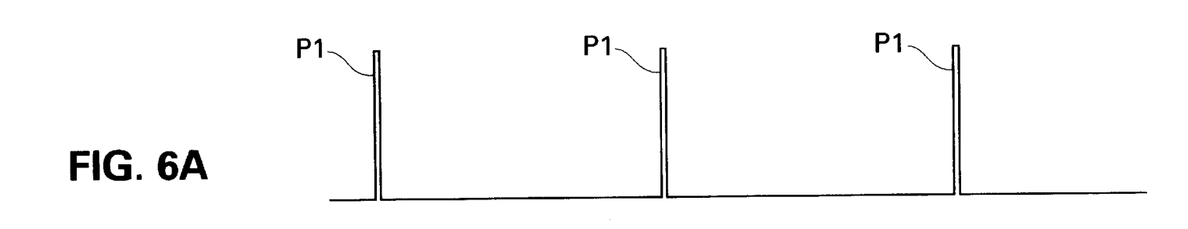
FIGS. 6A through 6D show electric waveforms of external synchronizing signals.
Figure 6B:
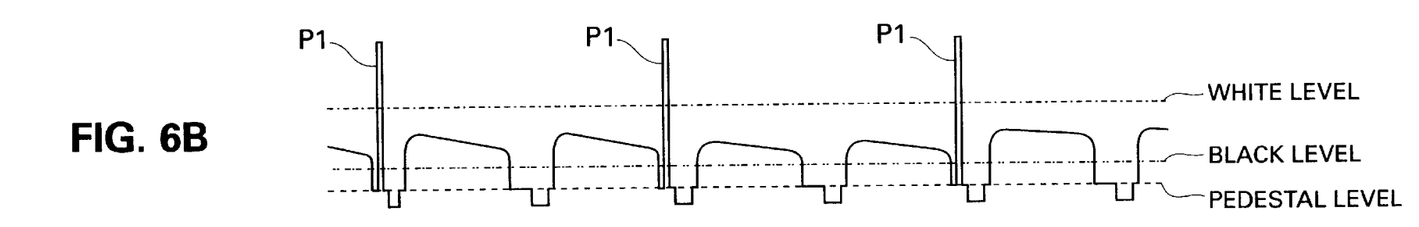
Figures 6C, 6D:
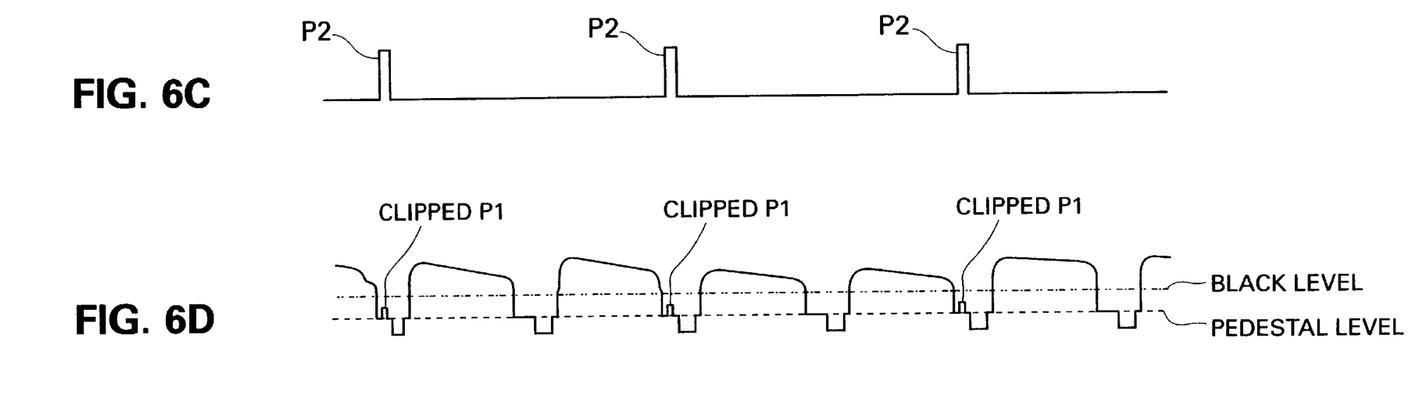

The external synchronizing generator 23 shown in FIG. 2 comprises a synchronizing pulse shaping and timing circuit 21 for forming and generating two pulse signals P1 and P2 corresponding to a predetermined rate, width and level, as shown in FIGS. 6(A) and 6(C), respectively, and is connected to the synchronizing pulse clipping circuit 24.

The phases of the pulse signals P1 and 1–2 correspond to the vertical blanking interval of the composite video signal, as shown in FIG. 6(B). At the same time, the pulse signals P1 and P2 shown have a frame rate, i.e. they are generated every second vertical field synchronizing signals. The frame synchronizing pulse signal P1 has a level higher than the white level for the composite video signal, as shown in FIG. 6(B).

Referring again to FIG. 2, it will be seen that the input of the synchronizing pulse adding circuit 22 is fed with pulse P1 outputted from the output terminal of the synchronizing pulse shaping and timing circuit 21 of the external synchronizing generator 23, and the output terminals of the synchronizing pulse adding circuit 22 are connected to the input terminal 13 of the receiver 20 for receiving the composite video signal fed from the transmitters 17 through the video transmission line 15 and for injecting the frame synchronizing pulse P1 into the video transmission line. Therefore a composite video signal is combined into a signal shown in FIG. 6(B), in which the pulse signal P1 is injected within the period corresponding to the vertical blanking interval.

The input of the synchronizing pulse clipping circuit 24 is fed with pulse P2 outputted from the synchronizing pulse shaping and timing circuit 21 for clipping a portion of the signal, which corresponds to the pulse signal P1 in the composite video signal circuit fed to the input of the synchronizing pulse clipping circuit 24, to below the black level of the composite video signal as shown in FIG. 6(D). Therefore, pulse P1 is removed from the video signal fed to the monitor 40 or VTR 42 through the synchronizing pulse clipping circuit 24 and is not outputted at the output terminal 11, and thus will not influence the image displayed on the monitor 40 or the video recorder 42.

Therefore, even if any pulse signal P1 is included in the video signal fed to the synchronizing pulse clipping circuit 24, the pulse signal P1 is essentially removed by the synchronizing pulse clipping circuit 24 so that the video signal outputted from the synchronizing pulse clipping circuit 24 does not include pulse signal P1.

The synchronizing pulse adding circuit 22 may be an injection circuit, using a well-known technique of mixing signals by employing readily available ICs, or by employing a discrete circuit using transistors, resistors and diodes. The frame synchronizing pulses injected into the composite video signal fed from the television cameras 14 are thereby present at the input terminal of the receiver 20 and throughout the video transmission line 15. Therefore, the composite video signal injected with the frame synchronizing pulse P1 is fed to the comparison circuit 52 of the television camera 14 through the transmitter terminal 16.

Instead of using the synchronizing pulse adding circuit 22 and the synchronizing pulse clipping circuit 24, the frame synchronizing pulse signal P1 may be outputted directly to the comparison circuit 52 of the television camera 14.

In case the television camera 14 is not provided with the comparison circuit 52, the pulse signal P1 and P2 may be outputted to the internal synchronizing generator 53 of the television camera 14. In the latter case, the synchronizing pulse adding circuit 22 and the synchronizing pulse clipping circuit 24 can be omitted.

In case the television camera 14 is synchronized by the horizontal and vertical synchronizing signals, or by a composite synchronizing signal, or the horizontal and vertical drive signals, a circuit for generating the horizontal and vertical synchronizing signals or the composite synchronizing signal, or the horizontal and vertical drive signals may be installed in the receiver 20 in place of the synchronizing pulse adding circuit 22 and the synchronizing pulse clipping circuit 24.

Different embodiments of the pulse shaping and timing circuit 21 are shown in FIGS. 7A, 7A-1 and 7B–7D.

Figure 7A:
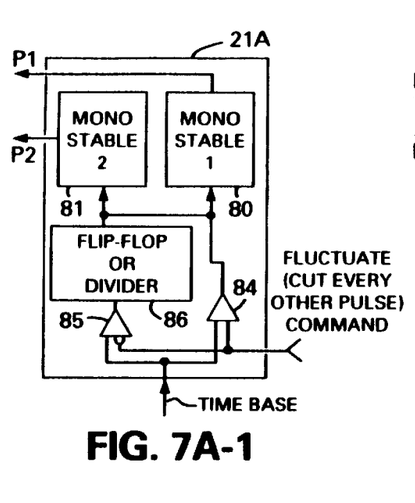
Figure 7A:
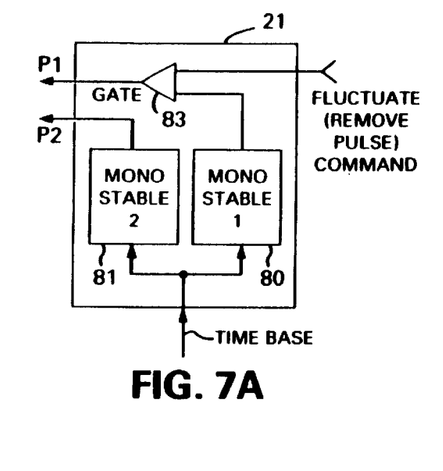
Figure 7B:
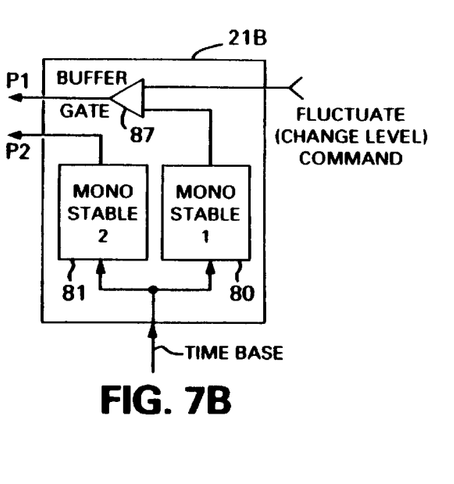
Figure 7C:
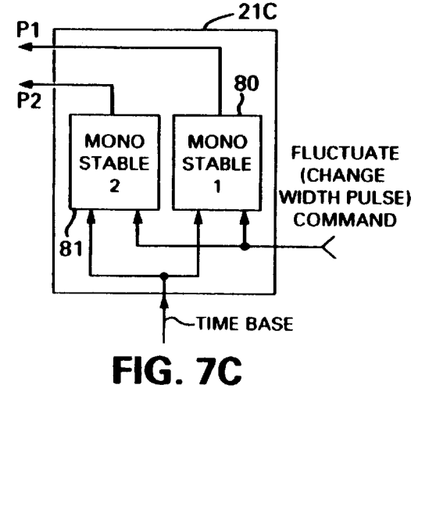
Figure 7D:
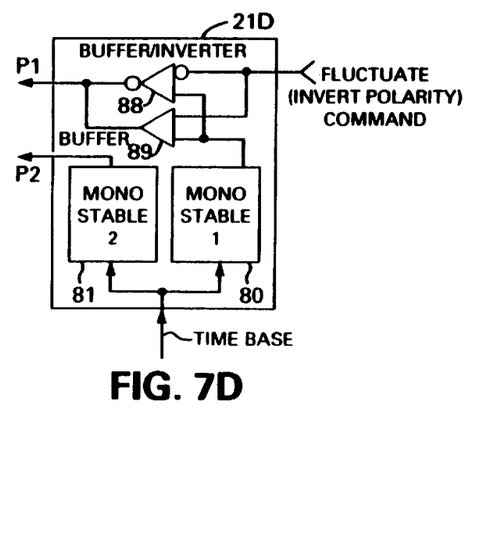

To cause a fluctuation in the width of an external synchronizing signal generated by the external synchronizing generator 23, the pulse timing and shaping circuit 21 may be formed as shown in FIG. 7C. The pulse timing and shaping circuit 21C comprises a monostable multivibrator circuit controlled by a fluctuation command signal generated by a fluctuation signal command circuit 32 for increasing or decreasing the width of the pulses P1 and P2.

The input of the pulse shaping and timing circuit 21 of the external synchronizing generator 23 is connected to the output of the fluctuation signal command circuit 32 and the input of the fluctuation signal command circuit 32 is fed from the timing error detector circuit 25.

The pulse shaping and timing circuit 21 may include a well-known gate circuit 83 of FIG. 7A to remove one or more pulses from the pulse train P1 fed to the synchronizing pulse adding circuit 22.

To remove every other pulse from the pulse train the pulse shaping and timing circuit 21A shown in FIG. 7A-1 may include a well-known flip-flop or divider circuit 86 controlled by well-known gate circuits 84 and 85.

In the case of fluctuating the pulse level or amplitude, the input of the pulse shaping and timing circuit 21B shown in FIG. 7B connected to the output of fluctuation signal command circuit 32 may be a conventional control input of a pulse buffer 87, wherein the fluctuation command signal will increase or decrease the amplitude or level of the outputted pulse P1.

Referring again to FIG. 2, the external synchronizing generator 23 further includes an external synchronizing time base circuit 27 connected to the pulse shaping and timing circuit 21 and to the fluctuation signal command circuit 32.

The second input of the fluctuation signal command circuit 32 is also fed with a timing signals generated by the external synchronizing time base circuit 27 of the external synchronizing generator 23 for providing a synchronous time base to the fluctuation command signal.

It should be noted that those parts of the television camera and the synchronizing signal generating circuit which are disclosed in the referenced patents have not been described herein in detail.

As further shown in FIG. 2, the input of the sync separator 28 which comprises of a well-known sync separator IC is connected to the transmission line 15 through terminal 13 for separating the sync portion from the received composite video signal and for outputting separated vertical and/or horizontal sync pulses to the timing error detector 25.

The timing error detector 25 which is a well-known coincidence pulse timing detector IC and is also fed with vertical and/or horizontal synchronizing pulses from the external synchronizing time base circuit 27 detects a timing coincidence between the vertical and/or the horizontal sync pulses fed from the sync separator 28 and the vertical and/or horizontal synchronizing pulses fed from the external synchronizing time base circuit 27 and generate no coincidence signal to fluctuate command circuit 32 when no coincidence is detected.

The fluctuate command circuit 32 which is also fed with a timing signal from the external synchronizing time base circuit will generate a fluctuate command signal, such as a negative or positive pulse synchronized with the external synchronizing time base, to the pulse shaping and timing circuit 21 which will modify or fluctuate the pulse signal P1, thereby feeding a fluctuated external synchronizing signal to the television camera of transmitter 17 through the sync adding circuit 22 and the transmission line 15.

The external synchronizing pulses outputted from the comparison circuit 52 of the television camera 14 are also fed to a fluctuated pulse detector circuit 56 (FIG. 4) for detecting a fluctuated external synchronizing pulse signal generated by the external synchronizing generator 23.

FIGS. 5A–5D show different embodiments of the fluctuated pulse detector 56.

Figure 4:
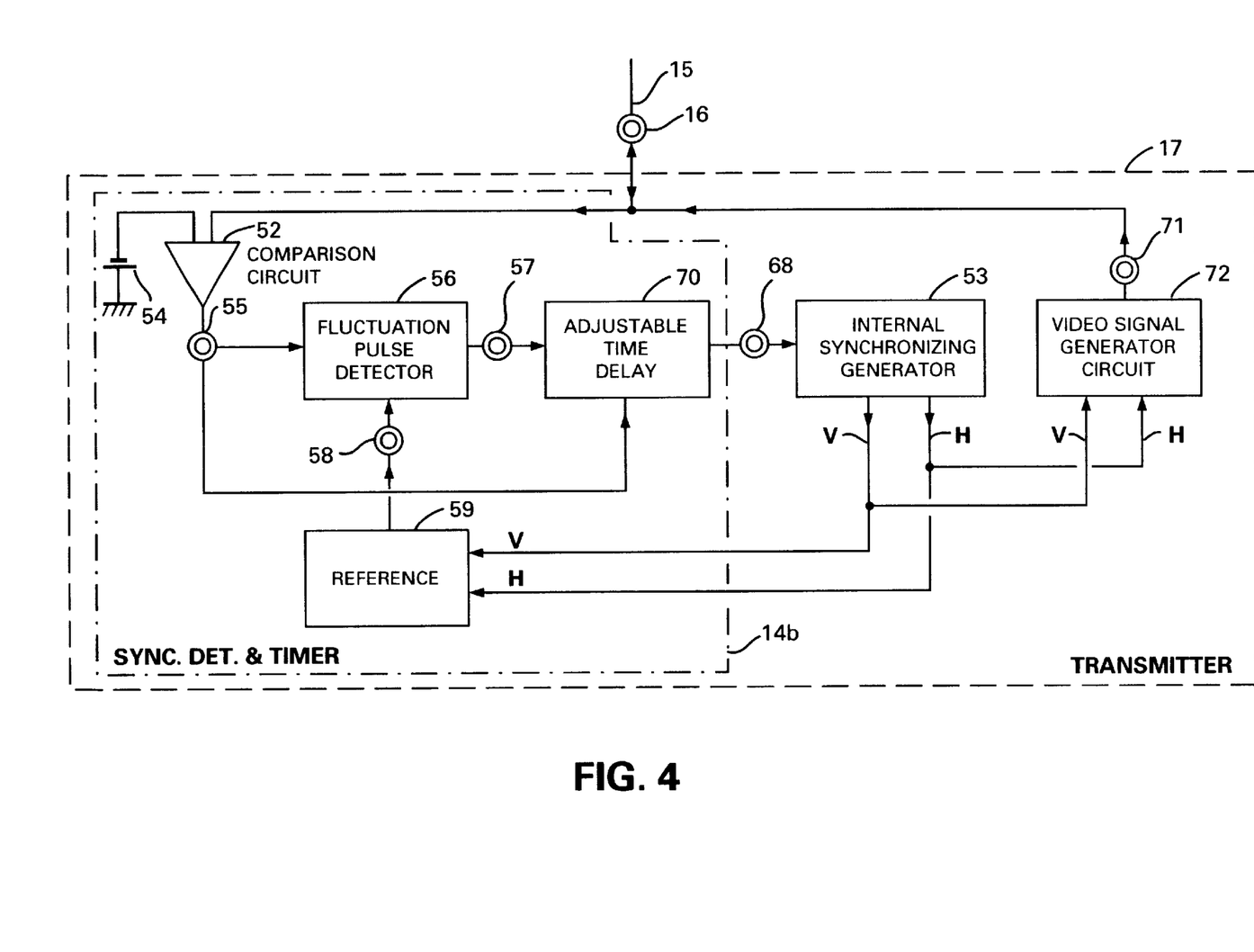
FIG. 4 is a block diagram of an electric circuit of a television camera according to a preferred embodiment of the present invention.
Figure 5A:
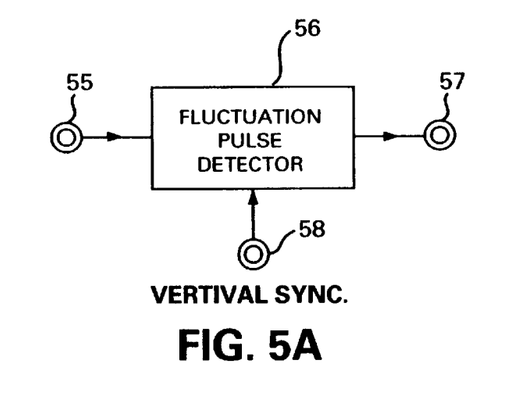
FIGS. 5A through 5D are block diagrams showing embodiments of the fluctuated pulse signal detecting circuit of the present invention.

As shown in FIG. 4 and also in FIG. 5A the fluctuated pulse detector 56 for detecting removed external synchronizing pulses is fed with a pulse signal outputted from the comparison circuit 52 of television camera 14 through an input terminal 55. A reference input terminal 58 of the fluctuated pulse detector circuit 56 is connected to receive a vertical sync signal generated by the internal synchronizing generator 53 and outputs a fluctuated signal through its output terminal 57 to an adjustable time delay circuit 70. Since the two pulse signals fed to the fluctuated pulse detector 56 from the comparison circuit 52 and the internal synchronizing generator 53 are mutually locked, the fluctuating pulse detector 56 which may comprise a well-known gate circuit compares the continuity of the pulse train at the terminal 57 and outputs a fluctuation signal whenever a pulse or several pulses are removed from the external synchronizing pulse train.

Figure 5B:
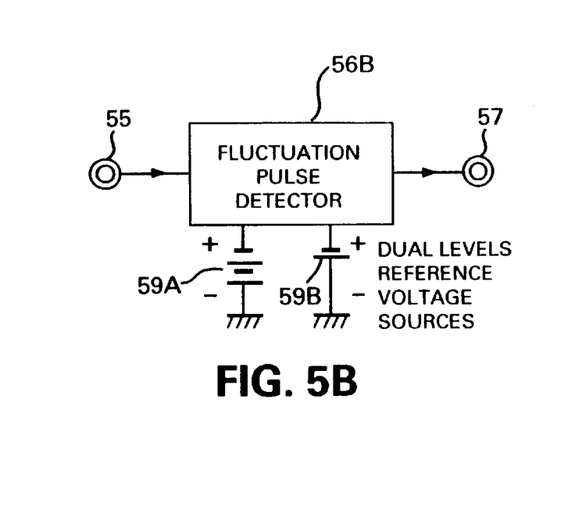

Referring to FIG. 5B, the fluctuated pulse detector 56B for detecting a decrease or increase in the pulse level or amplitude fed from the comparison circuit 52 of the TV camera through the input terminal 55, comprises a pulse level comparator having two reference voltage sources, higher level voltage reference source 59A and lower level voltage reference source 59B, and outputting a fluctuated signal through the output terminal 57 whenever the pulses fed through the input terminal 55 are lower than the lower reference voltage 59B, or higher than the higher reference voltage 59A.

Figure 5C:
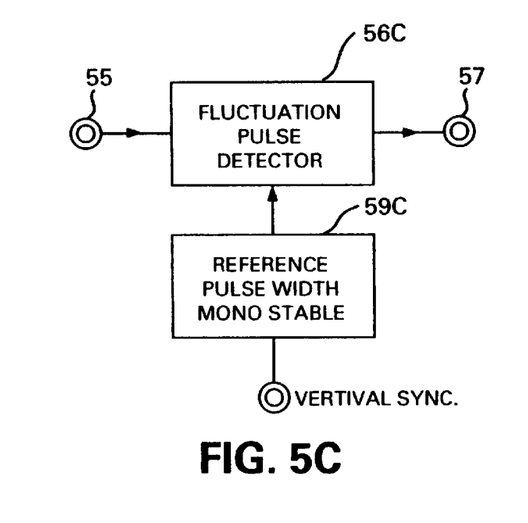

As explained above, the fluctuation in the external synchronizing signal generated by generator 23 can be obtained by changing the width of pulse P1. FIG. 5C shows the fluctuation pulse detector 56C, which is constructed for detecting decrease or increase in the width of the pulse fed from the comparison circuit 52 through input terminal 55. The fluctuated pulse detector 56 is fed with a reference pulse from a reference pulse width shaper 59C. The reference pulse width shaper 59C is fed with vertical synchronizing pulses generated by the internal synchronizing generator 53. The reference pulse width shaper 59C may be a well-known monostable multivibrator generating a reference pulse, having a width commensurate with the external synchronizing pulses and output the reference pulses to the fluctuated pulse detector 56C. The detection circuit of the fluctuated pulse detector 56C may include a well-known gate circuit or any other well-known and readily available pulse width comparator ICs or microprocessors.

Figure 5D:
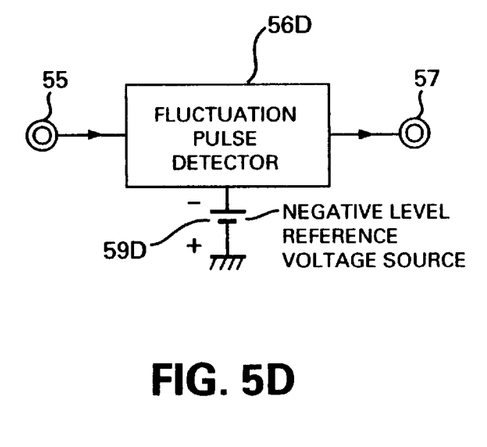

Fluctuation of a synchronizing signal may be obtained by reversing the polarity of pulse P1. A fluctuated pulse detector 56D of FIG. 5D is intended for detecting a reversed polarity pulse fed from the comparison circuit 52 of the TV camera through input terminal 55. The fluctuated pulse detector 56D of FIG. 5D comprises a level comparator having a reversed polarity reference voltage source 59D for outputting a fluctuated signal through the output terminal 57 whenever the pulse fed through input terminal 55 has a reversed polarity.

To fluctuate the pulse polarity of the synchronizing signal generated by the external synchronizing generator 23 as described above in connection with FIG. 2 and FIG. 7D, the pulse timing and shaping circuit 21D may include buffer-inverter circuits 88 and 89 controlled by the fluctuation command and a signal generated by the fluctuation signal command circuit 32 for reversing the polarity of pulse P1.

Figure 8:
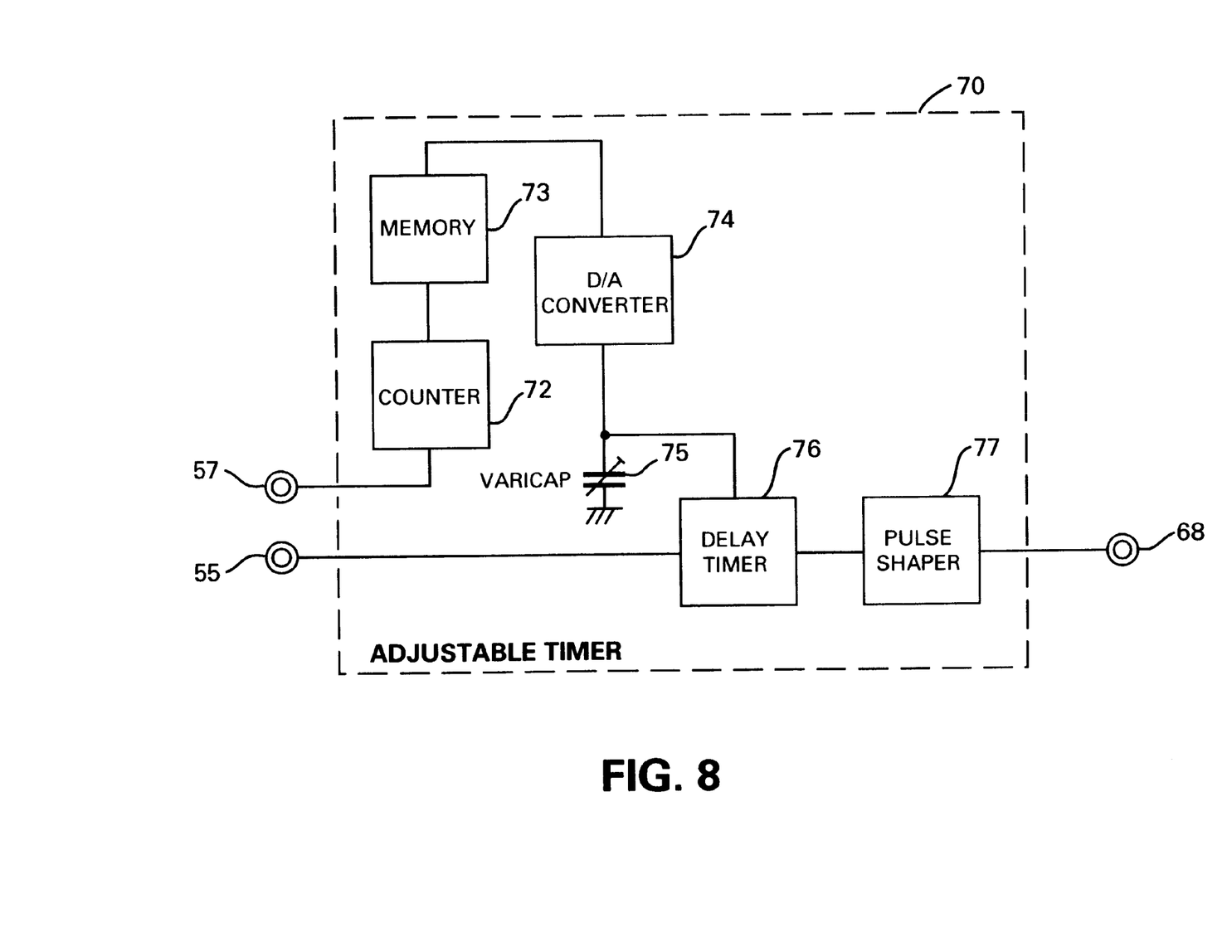
FIG. 8 is a block diagram showing an embodiment of an electric circuit for remotely adjusting a pulse delay.

FIG. 8 shows an adjustable timer circuit 70 which includes a digital counter 72 connected to the output of the fluctuation pulse detector 56 of FIG. 4 via terminal 57 for counting and outputting the number of the fluctuated pulses counted to a memory 73. The memory 73 which retains the counted number is connected to a D/A (digital to analog) converter 74 for applying a voltage level commensurating with the retained memory to a varicap 75, which is connected to a delay timer 76.

A change in the counted number of the fluctuated pulses will therefore change the voltage level applied to the varicap 75 which changes its capacitance accordingly and thereby readjusting the delay timer 76. The output of the timer 76 is fed to a pulse shaper that feeds a reshaped pulse to the internal sync generator 53 of FIG. 4 via terminal 68.

When the counter value is zero the voltage level applied to the varicap is zero and the timer delay is zero and when the counter value is a maximum value the output voltage level of the D/A converter 74 which is applied to the varicap 75 is a maximum value as well.

The time of the delay circuit is calculated so as to be effective for externally synchronizing the higher accurate horizontal synchronizing pulses, or the lesser accurate vertical sync pulses. For example, the time interval between the horizontal sync pulses of the NTSC system is about 63.5 $\mu$sec, for which 0.1 $\mu$sec tolerance will be sufficiently accurate to adequately synchronize and lock the horizontal lines of a television camera. As the propagation time delay through conductors is about 6 $\mu$sec per 1 Km, a time delay of up to 63 $\mu$sec in increments of 0.1 $\mu$sec can be effectively used for television cameras connected in a system that is stretching for up to 10 Km distances.

The time interval between vertical (field) sync pulses of the NTSC system is 16.6 msec, for which tolerance of a 10 $\mu$sec accuracy is adequate for synchronizing and locking the vertical fields of a television camera. Therefore a maximum time delay of 16.6 msec in increments of 10 $\mu$sec can be used to adequately externally synchronize a television monitoring system comprising television cameras that are connected via transmission lines of up to 280 Km long.

Accordingly, for distances of the above example the counter 72, the memory 73 and the D/A converter 74 along with the varicap 75 and the delay timer 76 are calculated to output time delays of between zero and up to 63.5 $\mu$sec in 0.1 $\mu$sec increments for external horizontal synchronization, or from zero and up to 16.6 msec in 10 $\mu$sec increments for external vertical synchronization.

The counter 72 can be an up-down counter or it can count in rotation up to the maximum count and back to zero, thereby providing remote adjustment in a closed loop process between the transmitter 17 and the receiver 20 of FIG. 1 wherein the receiver keeps fluctuating the external synchronizing signal until the timer is gradually adjusted to a time delay whereat the timing error detector 25 of FIG. 2 does no longer output timing error signal.

The timing error detector 25, the fluctuate command circuit 32 and the external synchronizing generator 23 of FIG. 2 as well as the fluctuated pulse detector 56, the reference circuit 59 and the adjustable time delay 70 of FIG. 4 are detailed and explained by using well-known circuitries, ICs and discrete components, however all the circuits can be combined into well-known gate arrays or LCA devices driven by microprocessor circuits for providing very accurate increments of timer adjustments and intelligent fluctuations such as modifying the level, width or polarity of the external synchronizing pulse into varying levels or widths relative to the time errors detected, and/or combine the fluctuation of the external synchronizing pulse by modifying simultaneously its level and width, or its level and polarity, or its width and polarity.

The timing error signal therefore can be a multiplexed signal fed to the fluctuate command circuit 32 and the fluctuated pulse detector 56 may feed the adjustable timer 70 with multiplexed intelligent command such as counting up or down and the time delay increments.

The description of the different embodiments of methods and apparatuses for remote adjustment of a time delay circuit above are based on closed circuit configurations wherein the time delay adjustment is an automatic self correcting process between the receiver and a transmitter of the system. However a closed circuit television apparatus for monitoring system consist of permanently installed and wired multiple television cameras and a receiving station and once the time delay circuits of all the cameras are adjusted, there is no need to readjust the time delay circuits again. For such an application it is possible to provide a manually adjusted time delay circuit into the television cameras and adjust each such television camera individually on site.

Figure 9:
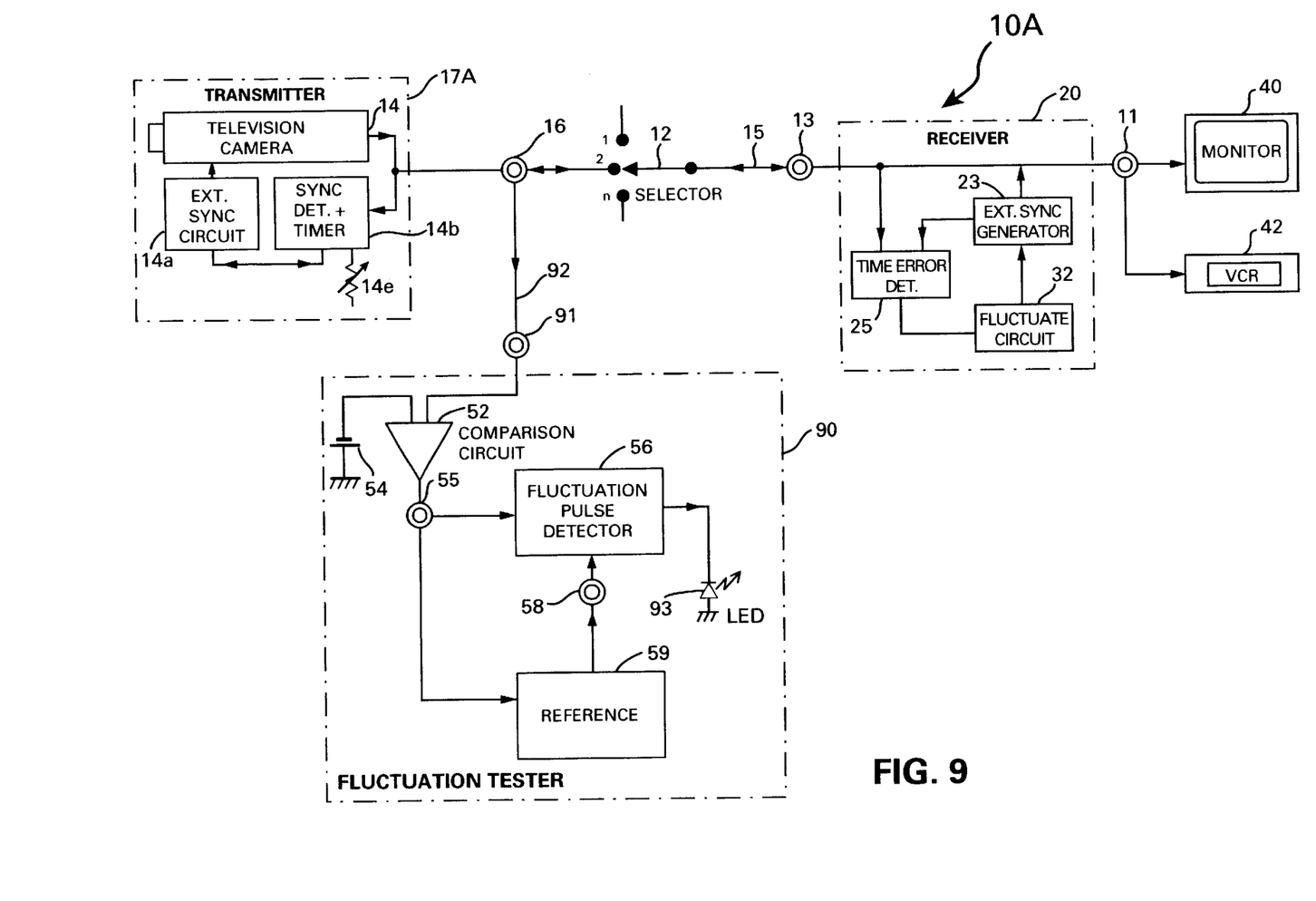
FIG. 9 is a block diagram of an electric circuit of on-site adjustment of the time apparatus delay with a fluctuation tester of another embodiment of the invention.

Referring to FIG. 9 which shows a second embodiment of the invention, an apparatus 10A for on site adjustment of the time delay circuit comprises a transmitter 17A incorporating television camera 14 connected to receiver 20 via transmission line 15 and selector switch 12 in a similar manner to the apparatus 10 of FIG. 1. The sync detector and timer 14C of FIG. 9 does not incorporate the fluctuation pulse detector 56 and the reference 59 of FIG. 4 while its adjusting circuit consist of a manual adjustment device such as a trimmer capacitor or a trimmer potentiometer 14e, instead of the counter 72, the memory 73, the D/A converter 74 and the varicap 75 shown in FIG. 8.

Since the receiver 20 generates an external synchronizing signal to externally synchronize the television camera 17A and will fluctuate the external sync signal when the adjustment device 14e is wrongly set, a service man can connect an oscilloscope to the transmission line at the camera site and adjust the adjustment device 14 of the time delay circuit 14C until the external synchronizing signal shown on the oscilloscope screen in no longer fluctuating.

Instead of an oscilloscope a fluctuation tester 90 shown in FIG. 9 can be made into a small pocket size tester for adjusting the time delay circuit of the transmitter 17A. The fluctuation tester 90 includes a comparison circuit 55 and a reference 54, identical with the comparison circuit 55 of the transmitter 17 of FIG. 4. The input 91 of the fluctuation tester 90 which is connected to the terminal 16 of the transmitter 17A through a test probe 92 and a terminal 91 feeds the video signal mixed with the external synchronizing signal which is propagated through terminal 16 to the input of the comparison circuit 55 that separates the external synchronizing signal and feeds the separated external synchronizing signal to the fluctuation pulse detector 56 and to reference 59, similar to the circuits of the transmitter 17 of FIG. 4. The output of the fluctuation pulse detector 56 is connected to an LED 93 for indicating the status of the fluctuated or non fluctuated external synchronizing signal. The fluctuation pulse detector 56 is identical in its detection process with the fluctuation pulse detector 56 of the transmitter 17 of FIG. 4 detailed above, with the exception that its output is fed to an indicator (LED) 93. The indicator 93 can be a dual color LED for displaying fluctuate/nonfluctuate state, or it can be switched on or switched off the during fluctuate state. The reference 59 may consist of an internal sync generator IC locked with the separated external synchronizing signal to supplant an uninterrupted chain of vertical sync pulses applied as a reference to the fluctuation pulse detector circuits 56 of FIG. 5A and 56C of FIG. 5C; otherwise the reference 59 is identical in its operation to the reference 59 of transmitter 17 of FIG. 4. It is apparent that the adjustment device Me of the time delay circuit 14c can be set at the camera site for adjusting the delay of the propagation time of the external synchronizing signal by the use of the fluctuation tester 90 of FIG. 9.

Figure 10:
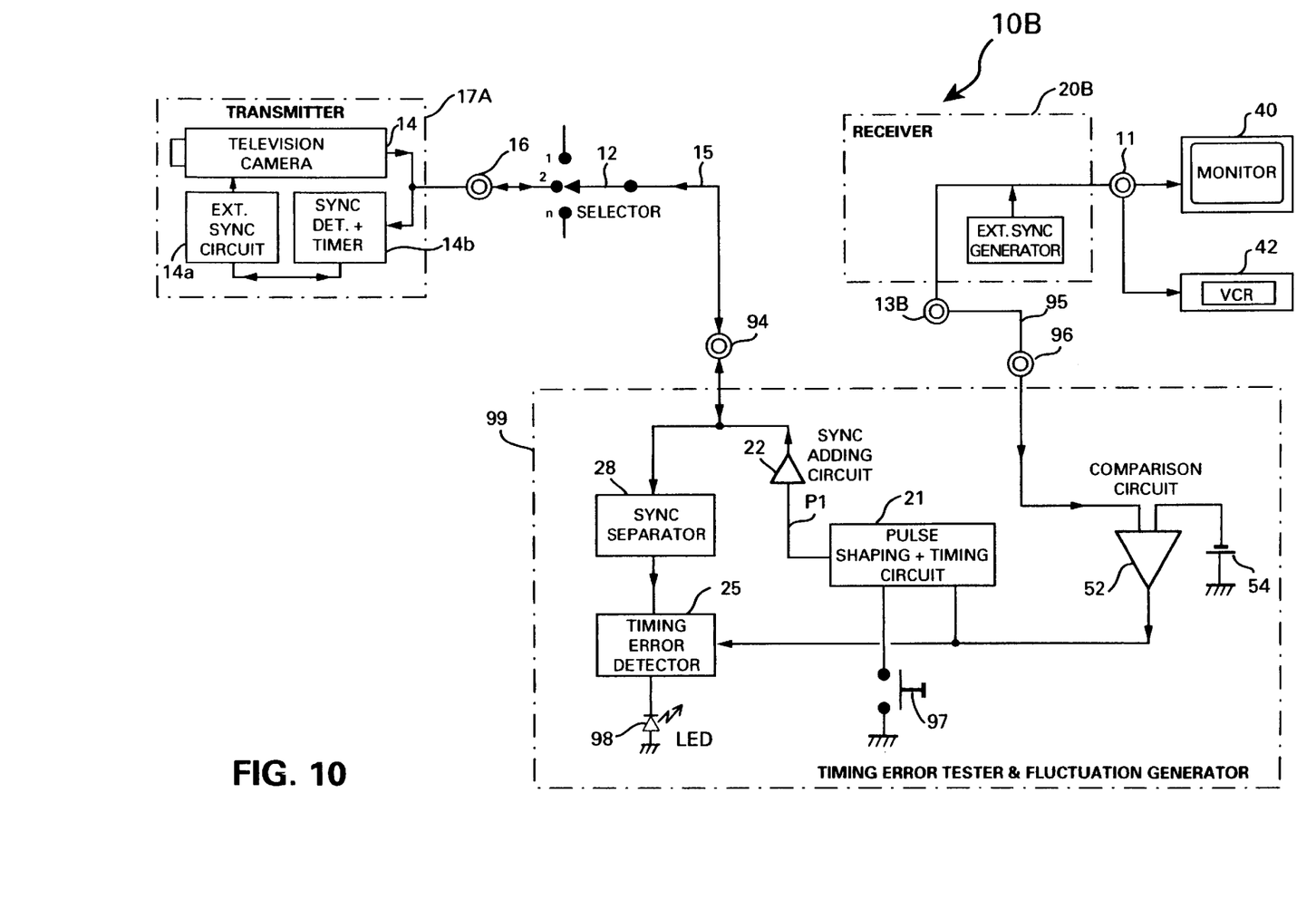
FIG. 10 is a block diagram showing yet another embodiment of an electric circuit for a remote adjustment of the time delay with a time error detector and a fluctuation signal generator.

Referring to FIG. 10, an apparatus 10B for manual adjustment of the time delay circuit 14b of a transmitter 17 from the receiver site of the present invention comprises a television camera 14, a sync detector and timer 14b and an external sync circuit 14a, identical with the camera 17 of the apparatus 10 of FIG. 1.

The receiver 20B however is a well-known receiver incorporating an external synchronizing generator but not the fluctuation circuit and the time error detector of the receiver 20 of apparatus 10.

The transmitter 17 is connected to the selector switch 12 and to an input 94 of a timing error tester and fluctuation generator 99 via transmission line 15. The other input 96 of the timing error tester and fluctuation generator 99 is connected through a test probe 95 to the input terminal 13B of the receiver 20B. The input 96 is connected to an input of a comparison circuit 52 which is identical with the comparison circuit 52 of the transmitter 17 of FIG. 4 and of the fluctuation tester 90 of FIG. 9, for separating the external synchronizing signal fed from the input 13B of the receiver 20B and feeding it to a pulse shaping and timing circuit 21.

The output of the pulse shaping and timing circuit 21 is connected to the sync adding circuit 22 which is identical with the sync adding circuit 22 of FIG. 2, while the control input of the pulse shaping and timing circuit 21 is connected to a fluctuate command switch 97. With the command switch in the off position the pulse shaping and timing circuit 21 will propagate the external synchronizing pulse in its original P1 shape through the sync adding circuit 22 to the transmission line 15, essentially by-passing the external synchronizing signal as is from the receiver 20B to the transmitter 17 via the transmission line 15 and the selector 12. With the fluctuate command switch in on position the pulse shaping and timing circuit fluctuate the external synchronizing signal the same way any of the circuits 21 and 21A–D of FIG. 7A–FIG. 7D) are fluctuating it; thereby the external synchronizing signal fed to the transmitter 17 will be fluctuated and the time delay circuit 14b will be remotely adjusted.

The sync separator circuit 28 and the timing error detector 25 are identical with the sync separator 28 and the timing error detector 25, respectively, of the receiver 20 of FIG. 2 with the exception that the output of the timing error detector is fed to a LED 98 for indicating timing errors. The indicator 98 can be a two color LED to indicate error/no error or can be switched on or switched off to indicate an error.

Thus it is apparent that a service man can remotely adjust a time delay circuit of the transmitter 17 from the receiver site by switching on the fluctuate command switch 97 until the indicator 98 indicates no timing errors.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. A method for delaying a propagation time of an external synchronizing signal transmitted from a receiver to a plurality of transmitters, each transmitting a video signal through an associated transmission line and through a selector to said receiver, wherein each of said transmitters includes an adjustable propagation delay timer for delaying propagation of said external synchronizing signal, the method comprising the steps of:

receiving said video signal from a transmitter through said selector and through said associated transmission line for detecting a time coincidence or a time difference between a sync portion of said received video signal and said external synchronizing signal; and modifying said external synchronizing signal in said receiver when the time difference is detected so that a fluctuated external synchronizing signal is produced, wherein said selected transmitter receives said external synchronizing signal and detects said fluctuated external synchronizing signal and gradually adjusts said propagation delay timer until said receiver detects said time coincidence and stops producing said fluctuated external synchronizing signal.

2. The method according to claim 1, wherein said external synchronizing signal is modified by removing at least one pulse from a pulse train of external synchronizing signals.

3. The method according to claim 1 wherein said external synchronizing signal is modified by widening a pulse width thereof.

4. The method according to claim 1, wherein said external synchronizing signal is modified by narrowing a pulse width thereof.

5. The method according to claim 1, wherein said external synchronizing signal is modified by increasing a pulse amplitude thereof.

6. The method according to claim 1, wherein said external synchronizing signal is modified by decreasing a pulse amplitude thereof.

7. The method according to claim 1, wherein said external synchronizing is signal is modified by reversing a pulse polarity thereof.

8. The method according to claim 1, wherein said external synchronizing signal is modified by increasing a pulse amplitude thereof combined with widening a pulse width thereof.

9. The method according to claim 1, wherein said external synchronizing signal is modified by decreasing a pulse amplitude thereof combined with narrowing a pulse width thereof.

10. The method according to claim 1, wherein said external synchronizing signal is modified by widening a pulse width thereof combined with reversing a pulse polarity thereof.

11. The method according to claim 1, wherein said external synchronizing signal is modified by narrowing a pulse width thereof combined with reversing a pulse polarity thereof.

12. The method according to claim 1, wherein said external synchronizing signal is modified by increasing a pulse amplitude thereof combined with reversing a pulse polarity thereof.

13. The method according to claim 1, wherein said external synchronizing signal is modified by decreasing a pulse amplitude thereof combined with reversing a pulse polarity thereof.

14. The method according to claim 1, wherein said transmission line is selected from the group consisting of coaxial cables, twisted pair wires, fiber optic cables, a wireless link, a microwave link, a satellite link, a public telephone network, a local area network, a cellular telephone network and any combination thereof.

15. The method according to claim 1, wherein said video signal is a composite video signal.

16. The method according to claim 1, wherein said video signal is a digital video signal.

17. The method according to claim 1, wherein said external synchronizing signal is selected from the group consisting of a vertical synchronizing signal, a vertical synchronizing signal, a horizontal synchronizing signal, a composite synchronizing signal, a vertical drive signal, and a vertical drive signal and a horizontal drive signal.

18. An apparatus for delaying propagation of an external synchronizing signal in a television system comprising a plurality of transmitters for transmitting video signals to a receiver, a plurality of transmission lines associated with said plurality of transmitters, a selector for connecting said plurality of transmission lines and for outputting a selected video signal to said receiver, said receiver including a circuit for generating external synchronizing signals and for transmitting said external synchronizing signal to said transmitters through said transmission lines, a circuit for detecting a time coincidence or a time difference between said external synchronizing signal and a sync portion of said selected video signal, and a circuit for modifying said external synchronizing signal to produce a fluctuated external synchronizing signal when said circuit for detecting a time coincidence or a time difference detects a time difference, each of said transmitters including an internal sync circuit synchronized by said external synchronizing signal, an adjustable delay timer for delaying application of said external synchronizing signal to said internal sync circuit, a fluctuated signal detector for detecting said fluctuated external synchronizing signal and for gradually adjusting said adjustable delay timer until said circuit for detecting a time coincidence or a time difference detects a time coincidence and said external synchronizing signal transmitted to said transmitter is no longer fluctuated.

19. The apparatus for delaying the propagation of an external synchronizing signal according to claim 18, wherein said circuit for generating external synchronizing signals includes an external synchronizing signal generator connected through said selector to said transmission lines adjacent to said receiver, for generating a synchronizing pulse signal having a voltage level higher than an maximal voltage level of a composite video signal transmitted by said transmitters or lower than a minimal voltage level of said composite video signal; and each transmitter includes a level comparator circuit means for receiving said synchronizing pulse signal transmitted over the transmission line, comparing said received synchronizing pulse signal to a reference signal having a voltage level comparable to the voltage level of the synchronizing pulse signal, generating a comparison pulse signal when said voltage level of said received synchronizing pulse signal is equal to or higher than the voltage level of said reference signal, and applying said comparison pulse signal to a transmitter associated with said level comparator circuit means, for synchronizing said transmitters to said external synchronizing signal.

20. The apparatus for delaying the propagation of an external synchronizing signal according to claim 19, wherein said synchronizing pulse signal has a voltage level lower than a minimum voltage level of said composite video signal and said level comparator circuit means generates a comparison pulse signal when said level of said received synchronizing pulse signal is equal to or lower than the voltage level of said reference signal.

21. The apparatus for delaying the propagation of an external synchronizing signal according to claim 18, wherein said circuit for generating external synchronizing signals includes external synchronizing signal generating circuit means for generating external synchronizing signals selected from the group consisting of vertical synchronizing pulses only, vertical synchronizing pulses, horizontal synchronizing pulses, and composite synchronizing pulses, for synchronizing said transmitters.

22. The apparatus for delaying the propagation of an external synchronizing signal according to claim 18, wherein said circuit for generating external synchronizing signals includes external synchronizing signal generating circuit means for generating external synchronizing signals consisting of a combination of vertical drive signals and horizontal drive signals, for driving synchronization circuits of said transmitters.

23. The apparatus for delaying the propagation of an external synchronizing signal according to claim 18, wherein said circuit for modifying said external synchronizing signal is a circuit for removing, upon command, at least one pulse from an external synchronizing pulse train.

24. The apparatus for delaying the propagation of an external synchronizing signal according to claim 18, wherein said circuit for modifying the external synchronizing signals include a divider circuit for removing, upon command, every other pulse from an external synchronizing signal pulse train.

25. The apparatus for delaying the propagation of an external synchronizing signal according to claim 18, wherein said circuit for modifying the external synchronizing signal includes a circuit for generating, upon command, a wider or narrower width of the external synchronizing pulse.

26. The apparatus for delaying the propagation of an external synchronizing signal according to claim 18, wherein said circuit for modifying the external synchronizing signal is a circuit to generate upon command, an increased or decreased amplitude of the external synchronizing pulse.

27. The apparatus for delaying the propagation of an external synchronizing signal according to claim 18, wherein said circuit for modifying the external synchronizing signal is a circuit for reversing upon command, a polarity of the external synchronizing pulse.

28. The apparatus for delaying the propagation of an external synchronizing signal according to claim 18, wherein said receiver is directly connected to a selected transmission line instead of to said selector.

29. An apparatus for delaying the propagation of an external synchronizing signal in a television system comprising a plurality of transmitters for transmitting video signals to a receiver, a plurality of transmission lines associated with said plurality of transmitters, a selector for connecting said plurality of transmission lines and for outputting a selected video signal to said receiver, wherein said receiver includes a circuit for generating and transmitting said external synchronizing signal to said transmitters through said transmission lines, the apparatus comprising:

a remote adjustment device interposed between said receiver and said selector and including a receiver connector for receiving said external synchronizing signal, a transmission line connector for receiving said selected video signal and for propagating said external synchronizing signal toward said transmitters, a circuit for detecting a time coincidence or a time difference between said external synchronizing signal and a sync portion of said selected video signal and for indicating said time coincidence or said time difference, and a circuit for modifying said external synchronizing signal to produce a fluctuated external synchronizing signal upon command when said circuit for detecting a time coincidence or a time difference indicates the time difference, and each of said transmitters including an internal sync circuit synchronized by said external synchronizing signal, an adjustable delay timer for delaying application of said external synchronizing signal to said internal sync circuit, a fluctuated signal detector for detecting said fluctuated external synchronizing signal and for gradually adjusting said adjustable delay timer until said circuit for detecting a time coincidence or a time difference detects the time coincidence and said external synchronizing signal transmitted to said transmitter is no longer fluctuated.

30. The apparatus for delaying the propagation of an external synchronizing signal according to claim 28, wherein said remote adjustment device is interposed between said receiver and a selected transmission line instead of between said receiver and said selector.

31. An apparatus for delaying propagation of an external synchronizing signal in a television system comprising a plurality of transmitters for transmitting video signals to a receiver, a plurality of transmission lines associated with said plurality of transmitters, a selector for connecting said plurality of transmission lines and for outputting a selected video signal to said receiver, wherein at least one of said transmitters includes an internal sync circuit synchronized by said external synchronizing signal through a manually adjustable delay timer for delaying application of said external synchronizing signal to said internal sync circuit, and an adjustment tester for aiding the site adjustment of said manually adjustable delay timer, said receiver including a circuit for generating and transmitting said external synchronizing signal to said transmitters through said transmission lines, a circuit for detecting a time coincidence or a time difference between said external synchronizing signal and a sync portion of said selected video signal, and a circuit for modifying said external synchronizing signal to produce a fluctuated external synchronizing signal when said circuit for detecting a time coincidence or a time difference detects the time difference and wherein said adjustment tester is connected to said transmission line adjacent to said transmitter and includes a circuit for extracting said external synchronizing signal and a circuit for detecting and indicating said fluctuated external synchronizing signal, thereby aiding in the adjustment of said propagation of delay time at the transmitter site.

\* \* \* \* \*